July 15, 1924.  1,501,436
G. CLAUDE
SYNTHESIS OF AMMONIA
Filed March 12, 1921
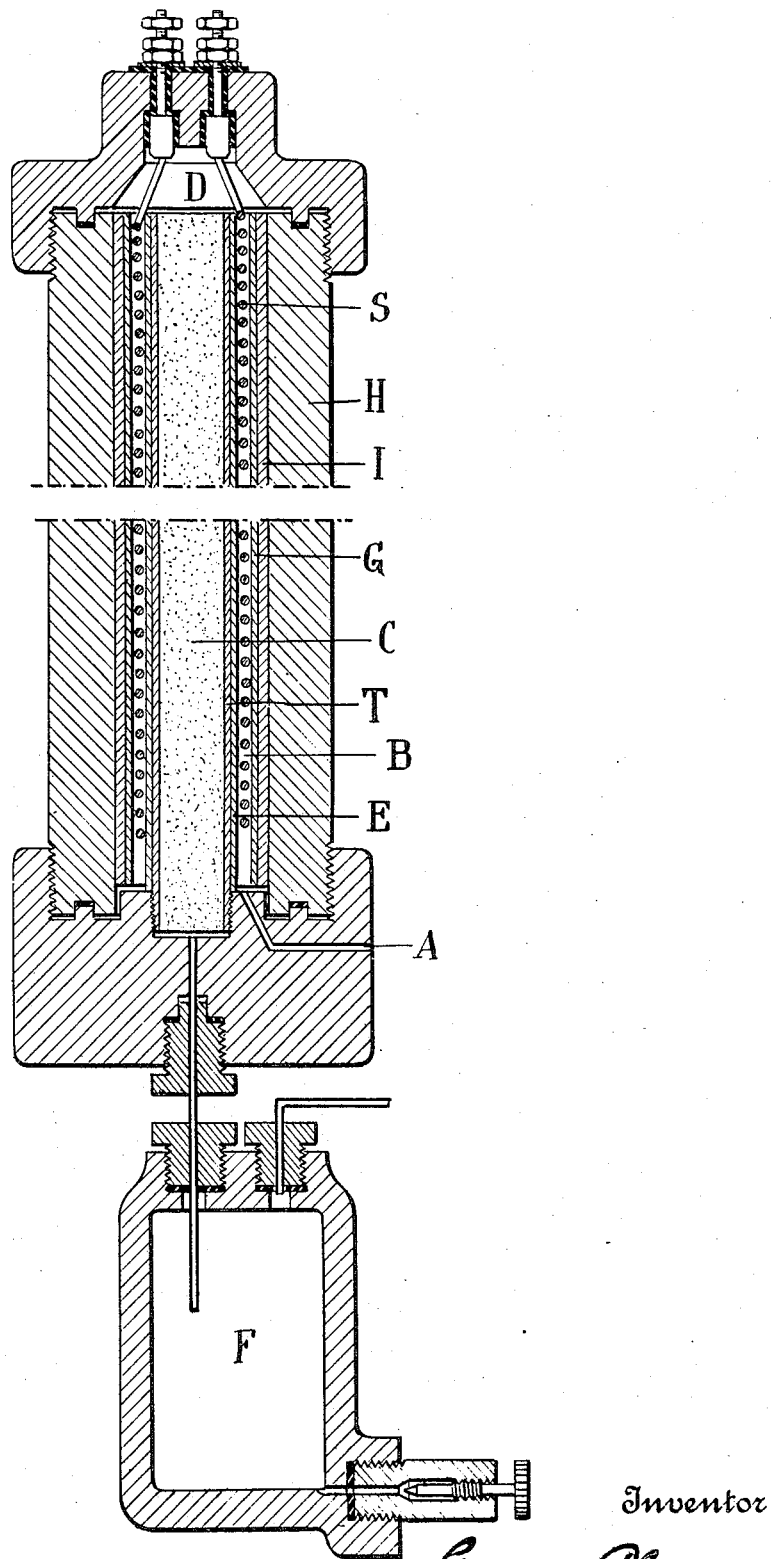
Inventor
Georges Claude
By his Attorney Patented July 15, 1924.

1,501,436

UNITED STATES PATENT OFFICE.

GEORGES CLAUDE, OF PARIS, FRANCE, ASSIGNOR TO SOCIETE L'AIR LIQUIDE (SOCIETE ANONYME POUR L'ETUDE ET L'EXPLOITATION DES PROCEDES GEORGES CLAUDE), OF PARIS, FRANCE.

SYNTHESIS OF AMMONIA.

Application filed March 12, 1921. Serial No. 451,765.

*To all whom it may concern:*

Be it known that I, GEORGES CLAUDE, a citizen of France, residing at Paris, France, have invented certain new and useful Improvements in Synthesis of Ammonia; and I do hereby declare the following to be a full, clear, and exact description of the invention, such as will enable others skilled in the art to which it appertains to make and use the same.

This invention relates to the synthesis of ammonia and has for its object the provision of a method and apparatus whereby the necessary reaction may be accomplished in an economical and effective manner and with assurance of successful operation.

Further objects and advantages of the invention will be apparent as it is better understood by reference to the following specification and accompanying drawing, in which the figure is a vertical section through a preferred form of the apparatus.

In the specification of French patent, No. 505,390, relating to the direct synthesis of ammonia, special means have been described for heating the gases which are to react, these means consisting in causing the gases to circulate in heat exchange relation with the catalyzing material, that is to say, in contact with the wall of the tube containing the catalyzing material, which wall is heated by the heat produced by the reaction, and is made of a material that is a good conductor of heat. In one form of apparatus for carrying out this process, namely, that shown in Fig. 2 of the drawings of the patent referred to above, the whole of the gases containing ammonia are made to pass through the catalyzing material, the ammonia being separated in a single liquefier at the outlet of the apparatus on issuing from the catalyzing material. It has, however, been found in the case of this arrangement that the process does not always give satisfactory results. It has in fact been found that in certain cases, for example, in the case of apparatus of somewhat limited yield, that the reaction instead of extending right up to the end of the catalyzing material adjacent to the liquefying and separating device stops short at a certain distance from this end. The catalyzing material and the apparatus are therefore inefficiently utilized. Furthermore, the entering gases, which in these circumstances become heated at the expense of the sensible heat of the gases which have already reacted and which pass through this non-acting part of the catalyzing material on their way to the ammonia separator, reach the outer zone of the tube corresponding to the region where the reaction takes place in a heated condition, and it may happen that they are no longer able to effect sufficient cooling of the catalyzing material so as to maintain it at the desired temperature. Consequently the temperature will progressively increase by reason of the well known cumulative effect of heat exchangers until undesirable values are attained. In order to diminish this latter disadvantage it would be necessary to increase the capacity for elimination of the heat through the pressure-supporting wall. This, however, presents difficulties even when there is used for the metal of this wall an alloy capable of directly resisting the action of the temperature and the gases present and which does not require protection by means of an internal insulating lining, and on the other hand, it would not afford a remedy for the first-mentioned disadvantage referred to above, namely, that a portion of the catalyzing material and of the apparatus adjacent to the liquefying and separating device is not utilized.

The object of the present invention is to provide means for avoiding the disadvantages referred to above.

According to this invention the process for the synthetic production of ammonia wherein the gases that are to react, prior to their arrival on the catalyzing material, are heated by heat exchange with this material by means of the heat given out by the reaction, is characterized by the fact that the thermal conductivity of the wall which separates the gases that are to react from the catalyzing material, for example, the tube containing the latter, is arranged to be of such value that under normal working conditions the gases reach the catalyzing material at a temperature preferably the lowest permitting the commencement of the reaction.

The above result is obtained, for instance, by constituting the tube itself of a suitable poor conducting material or by providing the tube of ordinary steel with a suitable insulating lining or lagging such as asbestos. Under these conditions the issuing gases carry away a portion of their sensible heat which would have been retained in the interior of the apparatus in the case previously considered of a tube which is a good conductor, and which would have brought about the rise in temperature that it is desired to avoid.

However, as in practice it might be difficult to make the value of the thermal conductivity of the wall in question exactly equal to that corresponding to the desired conditions, it is preferably given a value such as would create a tendency for the gases to reach the catalyzing material a little too cold and then the heating of the gases is supplemented by external means which would, moreover, be regulable in the event of any occurence that might upset the stability of working. For the same purpose of stability of working, recourse may be had to an injection of cold gas at the hot end of the tube indicated at D on the drawing, and it is advisable that the heat-insulating material be such that its thermal conductivity increases as little as possible on increase of temperature. It may be pointed out that a heat-insulating material, the thermal conductivity of which would decrease with the temperature, would tend towards automatic stability of working.

The present invention is especially applicable when hyper-pressures are used, but it may also be used with advantage in other cases if the pressure is sufficiently high.

The accompanying drawing represents in section, by way of example, a device for carrying out the process in accordance with the present invention. T is a thin tube containing the catalyzing material C and surrounded by a heat-insulating lagging E that resists the passage of heat. H is the external pressure-resisting tube which is protected from the action of temperature and of the gases by a layer I of heat-insulating material located between the tube H and a thin tube G. S is an electric heating coil and F is a cooling receptacle.

The gases which are to react are admitted through A and circulate in the space B wherein they become heated by contact with E so as to reach the catalyzing material at D at the most temperature which, permits the commencement of the reaction, this temperature being about 500° C. with the catalyzing materials ordinarily used and employing gaseous pressures of the order of about 1000 atmospheres. The reaction gases, after passing over the catalyzing material C, enter the receptacle F where the ammonia formed is separated by liquefaction, and the residual gases are returned to the same circuit, either in the manner explained with reference to the apparatus shown in Fig. 2 of the French patent specification hereinbefore mentioned or with the assistance of a pump; the residual gases may also if desired be sent into a second catalyzer apparatus similar to the first and thereafter, if necessary, into other succeeding apparatus, and so on, the ammonia formed being separated on each occasion.

The heat-insulating lagging E may also be such that the transmission of heat to the gases which are to react raises them only to a temperature a little lower than the reaction temperature, and the supplementary heat required is then supplied by the heating coil 3. This method of operation is, as has been previously mentioned, especially efficacious in preventing any instability of working.

From the foregoing, it will be understood that the difficult operation involved in the synthetic production of ammonia by direct reaction of nitrogen and hydrogen in the presence of a catalyzer is materially improved and the desired result is accomplished in a more simple and effective manner than has been heretofore possible.

Various changes may be made in the details of the method and apparatus without departing from the invention or sacrificing any of the advantages thereof.

I claim:

1. The method of carrying out the direct synthesis of ammonia in the presence of a catalyzing material and under the combined effect of high temperature and pressure, which comprises conveying the gaseous mixture prior to the reaction in heat-exchange relation with the reacting gases in the catalyzing chamber, and limiting the transfer of heat from the catalyzing chamber to the gaseous mixture so that the gaseous mixture is delivered to the catalyzing material at a temperature preferably the lowest permitting the commencement of the reaction.

2. The method of carrying out the direct synthesis of ammonia in the presence of a catalyzing material and under the combined effect of high temperature and pressure, which comprises conveying the gaseous mixture prior to the reaction in heat-exchange relation with the reacting gases in a catalyzing chamber and arranging the heat conductivity of the wall separating the catalyzing chamber from the space for circulation of the gaseous mixture so that the gaseous mixture is delivered to the catalyzing material at a temperature preferably the lowest permitting the commencement of the reaction.

3. The method of carrying out the direct synthesis of ammonia in the presence of a catalyzing material and under the combined effect of high temperature and pressure, which comprises conveying the gaseous mixture prior to the reaction in heat-exchange relation with the reacting gases in the catalyzing chamber, limiting the transfer of heat from the catalyzing chamber to the gaseous mixture so that the gaseous mixture is heated to a temperature somewhat less than the lowest temperature permitting the commencement of the reaction, and supplying additional heat to the gaseous mixture in regulated quantities from an external source.

4. In an apparatus for the direct synthesis of ammonia in the presence of a catalyzing material and under the influence of combined effect of high temperature and pressure, the combination of a pressure-sustaining shell, a tube within the shell to support the catalyzing material, and a heat insulating material externally covering the tube to limit transfer of heat therethrough, and means for introducing the gaseous mixture to the space between the shell and insulating wall wherein it passes in heat exchanging relation with portions thereof reacting in contact with the catalyzing material.

5. In an apparatus for the direct synthesis of ammonia in the presence of a catalyzing material and under the influence of combined effect of high temperature and pressure, the combination of a pressure-sustaining shell and a tube made of material of low heat conductivity within the shell to support the catalyzing material, the space between the shell and tube being adapted for the passage of the gaseous mixture in heat-exchanging relation with portions thereof reacting in contact with the catalyzing material.

6. In an apparatus for the direct synthesis of ammonia in the presence of a catalyzing material and under the influence of combined effect of high temperature and pressure, the combination of a pressure-sustaining shell, a tube within the shell to support the catalyzing material, a heat insulating wall surrounding the tube to limit transfer of heat therethrough, the space between the shell and insulating wall being adapted for the passage of the gaseous mixture in heat exchanging relation with portions thereof reacting in contact with the catalyzing material, and heating means within the space whereby heat from an external source may be imparted to the gaseous mixture prior to contact thereof with the catalyzing material.

7. In an apparatus for the direct synthesis of ammonia in the presence of a catalyzing material and under the influence of combined effect of high temperature and pressure, the combination of a pressure-sustaining shell, a tube within the shell to support the catalyzing material, a heat insulating wall surrounding the tube to limit transfer of heat therethrough, the space between the shell and insulating wall being adapted for the passage of the gaseous mixture in heat exchanging relation with portions thereof reacting in contact with the catalyzing material, and an electric heating element within the space whereby heat from an external source may be imparted to the gaseous mixture prior to contact thereof with the catalyzing material.

8. In an apparatus for the direct synthesis of ammonia in the presence of a catalyzing material and under the influence of combined effect of high temperature and pressure, the combination of a pressure-sustaining shell, a tube within the shell to support the catalyzing material, a heat insulating material externally covering the tube to limit transfer of heat therethrough, the space between the shell and insulating wall being adapted for the passage of the gaseous mixture in heat exchanging relation with portions thereof reacting in contact with the catalyzing material, and heating means whereby heat from an external source may be imparted to the gaseous mixture prior to contact thereof with the catalyzing material.

In testimony whereof I affix my signature

GEORGES CLAUDE.